(12) United States Patent
Stephan et al.

(10) Patent No.: US 9,473,066 B2
(45) Date of Patent: Oct. 18, 2016

(54) MOUNTING ASSEMBLIES FOR SOLAR PANEL SYSTEMS AND METHODS FOR USING THE SAME

(71) Applicant: Pegasus Solar Inc., San Jose, CA (US)

(72) Inventors: Erich Kai Stephan, Newport Beach, CA (US); Glenn Harris, Sausalito, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 0 days.

(21) Appl. No.: 14/671,669

(22) Filed: Mar. 27, 2015

(65) Prior Publication Data

US 2015/0280638 A1   Oct. 1, 2015

Related U.S. Application Data

(60) Provisional application No. 61/973,785, filed on Apr. 1, 2014.

(51) Int. Cl.
*H02S 20/23* (2014.01)
*F24J 2/52* (2006.01)

(52) U.S. Cl.
CPC ............ *H02S 20/23* (2014.12); *F24J 2/5245* (2013.01); *F24J 2/5258* (2013.01); *F24J 2/5264* (2013.01); *Y02B 10/12* (2013.01); *Y02E 10/47* (2013.01)

(58) Field of Classification Search
CPC ...... H02S 20/23; F24J 2/5205; F24J 2/5258; F24J 2/5245; F24J 2/525; F24J 2/5264; H01R 4/38; Y02E 10/47; Y02B 10/12
See application file for complete search history.

(56) References Cited

U.S. PATENT DOCUMENTS

| | | |
|---|---|---|
| 5,746,029 A | 5/1998 | Ullman |
| 6,360,491 B1 | 3/2002 | Ullman |
| 7,406,800 B2 | 8/2008 | Cinnamon et al. |
| 7,592,537 B1 | 9/2009 | West et al. |
| 7,762,027 B1 | 7/2010 | Wentworth et al. |
| 7,832,157 B2 | 11/2010 | Cinnamon et al. |
| 7,866,098 B2 | 1/2011 | Cinnamon et al. |
| 7,895,808 B1 | 3/2011 | Wentworth et al. |
| 7,905,064 B1 | 3/2011 | Wentworth et al. |
| 7,987,641 B2 | 8/2011 | Cinnamon et al. |
| 8,092,129 B2 | 1/2012 | Wiley et al. |

(Continued)

FOREIGN PATENT DOCUMENTS

| | | | |
|---|---|---|---|
| EP | 2363892 A2 * | 9/2011 | ............ F24J 2/5249 |
| WO | 2014028431 A1 | 2/2014 | |

OTHER PUBLICATIONS

International Search Report and Written Opinion for PCT/US2015/023339, mailed Jul. 2, 2015.

*Primary Examiner* — Adriana Figueroa
*Assistant Examiner* — Jessie Fonseca
(74) *Attorney, Agent, or Firm* — Joseph Weatherbee, Esq.; Polsinelli LLP (57) ABSTRACT

A solar panel mount assembly includes a base portion mountable to an installation surface, and a support arm defining a support shoulder. The support arm is coupled to the base portion. The support arm and base portion cooperate to accommodate positioning the support arm at an adjustable distance relative to the installation surface. The solar panel mount assembly further includes a rotatable clamp assembly coupled to the support shoulder, and includes at least two brackets that releasably secure a portion of one or more solar panels.

14 Claims, 12 Drawing Sheets

(56) References Cited

U.S. PATENT DOCUMENTS

| | | |
|---|---|---|
| 8,109,048 B2 | 2/2012 | West et al. |
| 8,153,700 B2 | 4/2012 | Stearns et al. |
| 8,166,713 B2 | 5/2012 | Stearns et al. |
| 8,353,650 B2 | 1/2013 | Wiley et al. |
| 8,375,654 B1 | 2/2013 | West et al. |
| 8,505,248 B1 | 8/2013 | Leong et al. |
| 8,505,864 B1 | 8/2013 | Taylor et al. |
| 8,608,418 B2 | 12/2013 | Wiley et al. |
| 8,756,881 B2 | 6/2014 | West et al. |
| 8,813,460 B2 | 8/2014 | Cinnamon et al. |
| 8,875,455 B1 | 11/2014 | Yang et al. |
| 2010/0276558 A1* | 11/2010 | Faust .................... F24J 2/5205 248/222.14 |
| 2010/0307074 A1 | 12/2010 | Stearns et al. |
| 2011/0001030 A1* | 1/2011 | Hochreiter ............ F24J 2/5207 248/316.1 |
| 2011/0100434 A1* | 5/2011 | Van Walraven ....... F24J 2/5205 136/251 |
| 2011/0126881 A1* | 6/2011 | Hong .................... F24J 2/5205 136/244 |
| 2011/0174947 A1* | 7/2011 | Wu ....................... F24J 2/5205 248/226.11 |
| 2011/0214365 A1* | 9/2011 | Aftanas ................. F24J 2/5258 52/173.3 |
| 2013/0011187 A1* | 1/2013 | Schuit ..................... F16B 2/065 403/287 |
| 2013/0048815 A1 | 2/2013 | Wagner et al. |
| 2013/0340358 A1* | 12/2013 | Danning ................. B23P 11/00 52/126.7 |
| 2014/0041706 A1* | 2/2014 | Haddock ............... F24J 2/5254 136/244 |
| 2014/0042286 A1* | 2/2014 | Jaffari .................... F16B 2/065 248/316.4 |
| 2014/0169909 A1 | 6/2014 | Wiley et al. |
| 2015/0249423 A1* | 9/2015 | Braunstein ............. H02S 20/23 52/173.3 |

* cited by examiner

MOUNTING ASSEMBLIES FOR SOLAR PANEL SYSTEMS AND METHODS FOR USING THE SAME

CROSS-REFERENCE TO RELATED APPLICATIONS

The present application is claiming priority of U.S. Provisional Patent Application Ser. No. 61/973,785, filed on Apr. 1, 2014, the content of which is herein incorporated by reference.

BACKGROUND

1. Technical Field

The present disclosure relates to solar panel installation, and more specifically to solar panel mounting assemblies and methods for using the same.

2. Introduction

As solar energy becomes more economical to produce electricity for direct consumption, more solar energy systems are being installed on rooftops. Typically, components of the solar energy systems such as solar panels are installed using conventional mounting structures, including support beams and L-type brackets. Operatively, the solar panels are secured to the support beams, which in turn, are secured to the L-type brackets. The L-type brackets are then bolted to a structure (e.g., a rooftop, etc.). However, such conventional mounting structures typically have minimal adjustability, and require a large number of support beams to adequately support each solar panel. Accordingly, these conventional mounting structures can result in excessive material and extensive installation time.

SUMMARY

Solar energy module support assemblies are described herein and provide flexible, three-dimensional adjustability to secure a solar panel to an installation surface. Certain embodiment discussed herein include features that permit pre-subassembly of the support assemblies for reduced down-stream labor, and rapid installation, adjustment, and securement of a module to a supporting surface.

According to one embodiment, a solar panel mount assembly includes a base portion, a support arm coupled to the base portion (e.g., using complimentary threading patterns, etc.), and a rotatable clamp assembly. The support arm defines a support shoulder, and the rotatable clamp assembly couples to the support shoulder. The support arm and base portion cooperate to accommodate positioning the support arm at an adjustable distance relative to the installation surface. Further, the solar panel mount assembly includes a rotatable clamp assembly coupled to the support shoulder. The rotatable clamp assembly typically includes at least two brackets that releasably secure a portion of one or more solar panels. The at least two brackets are composed of a first bracket component and a second bracket component. A first bracket component includes a top flange and bottom flange on a first side that define the first bracket. Also, the first bracket component includes a top flange on a second side which coordinates with a bottom flange of the second bracket component to define the second bracket.

In some embodiments, the solar panel mount assembly includes a fastener that couples the clamp assembly to the support arm. The fastener defines a fastener axis, which the rotatable clamp assembly rotates about. The fastener, in these embodiments, can permit or prohibit rotation of the rotatable clamp assembly.

In other embodiments, the base plate can include a flashing having a protrusion. Such protrusion is received by a cavity defined in the base portion. In this fashion, the protrusion effectively creates a seal around a fastener disposed in the cavity (e.g., to secure the base portion to the flashing and/or the installation surface).

In certain other embodiments, the solar panel mount assembly further includes a retaining clip disposed between the support arm and the clamp assembly. The retaining clip can secure wires to the solar panel mount assembly and/or it may secure a fastener to a support arm. The retaining clip can include one or more protrusions that penetrate a coating (e.g., an anodization layer) of the support arm and clamp assembly to provide electrical connectivity there-between (e.g., including the support arm, the clamp assembly, and the fastener, etc.)

In alternative embodiments, one of the two bracket components of the rotatable clamp assembly have at least a portion configured for independent degrees of displacement relative to the other bracket component (e.g., when the other bracket component releasably secures a portion of a solar panel, etc.). A fastener, in these embodiments, can cooperate with the support arm and the clamp assembly to increase or decrease the independent degrees of displacement of the at least the portion of one of the bracket components when each bracket component releasably secures the portion of the corresponding solar panel. For example, when the fastener is loosened, the fastener can facilitate or increase the degrees of displacement, and when the fastener is tightened, it prohibits or decreases the independent degrees of displacement.

In other embodiments, each bracket includes a top flange and a bottom flange that cooperate to releasably secure the portion of a corresponding solar panel. The brackets are composed of a first bracket component and a second bracket component. Also, the bracket components include flanges. According to these embodiments, one of the flanges (e.g., top flange or bottom flange) for at least one of the bracket components includes protrusions (e.g., spikes) that engage a portion of the corresponding solar panel to releasably secure the corresponding panel. For example, the protrusions can puncture a frame of the corresponding solar panel. Further, in certain instances, the protrusions puncture the frame, including an anodize layer, to form an electrical path In certain other embodiments, the solar panel mount assembly also includes a base plate (which may be a flashing), which couples to the base portion. In other embodiments, the solar panel mount assembly includes a wire clip disposed between the support arm and the clamp assembly. The wire clip can, for example, releasably secure wiring for the solar panel, retain/secure a fastener between the rotatable clamp assembly and the support arm, include protrusions that penetrate anodization or paint on one or both the bottom clamp and the support arm, thereby creating an electrical bond path between the arm, bottom clamp, and fastener.

According to another embodiment, a solar panel clamp assembly includes a first bracket component that releasably secures a solar panel, and a second bracket component having at least a portion of the second bracket component independently movable relative to the first bracket component when the first bracket component releasably secures the solar panel. The solar panel clamp assembly further includes a fastener that releasably secures the first bracket component and the second bracket component together to form the clamp assembly. The fastener facilitates or prohibits movement of the at least the portion of the second bracket component. In addition, the first bracket and the second bracket each include a corresponding top flange a bottom flange that cooperate to secure a corresponding solar panel. Further, certain portions of the first bracket component form portions of the flange of the second bracket when the fastener releasably secures the first bracket component and the second bracket component together.

A method for securing solar panels to a solar panel mount assembly is also disclosed. Steps for securing the solar panel include securing a base portion of the solar panel mount assembly to an installation surface, and securing a support arm of the solar panel mount assembly to the base portion. Notably, the support arm defines a support shoulder that supports a rotatable clamp assembly, which clamp assembly includes at least a first bracket component and a second bracket component. The method also includes steps for releasably securing a first solar panel to the first bracket component of the rotatable clamp assembly, adjusting a degree of displacement for a portion of the second bracket component independent from the first bracket component, and releasably securing a second solar panel to the second bracket component after adjusting the degree of displacement for the portion of the second bracket component. The degree of displacement for the portion of the second bracket component when the second solar panel is releasably secured to the second bracket component by, for example, tightening a fastener. In certain embodiments, the method further includes securing the base portion to a base plate (e.g., a flashing, etc.) mounted to the installation surface.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

While novel concepts of the invention herein are susceptible to numerous embodiments and implementations, they will be best understood by a detailed examination of certain specific embodiments. Such embodiments are depicted in the drawings and described below. Additionally, although specific embodiments and implementations are discussed below, it should be understood that this is done for illustration purposes only. A person skilled in the relevant art will recognize that other components and configurations may be used without parting from the spirit and scope of the disclosure.

Figure 1:
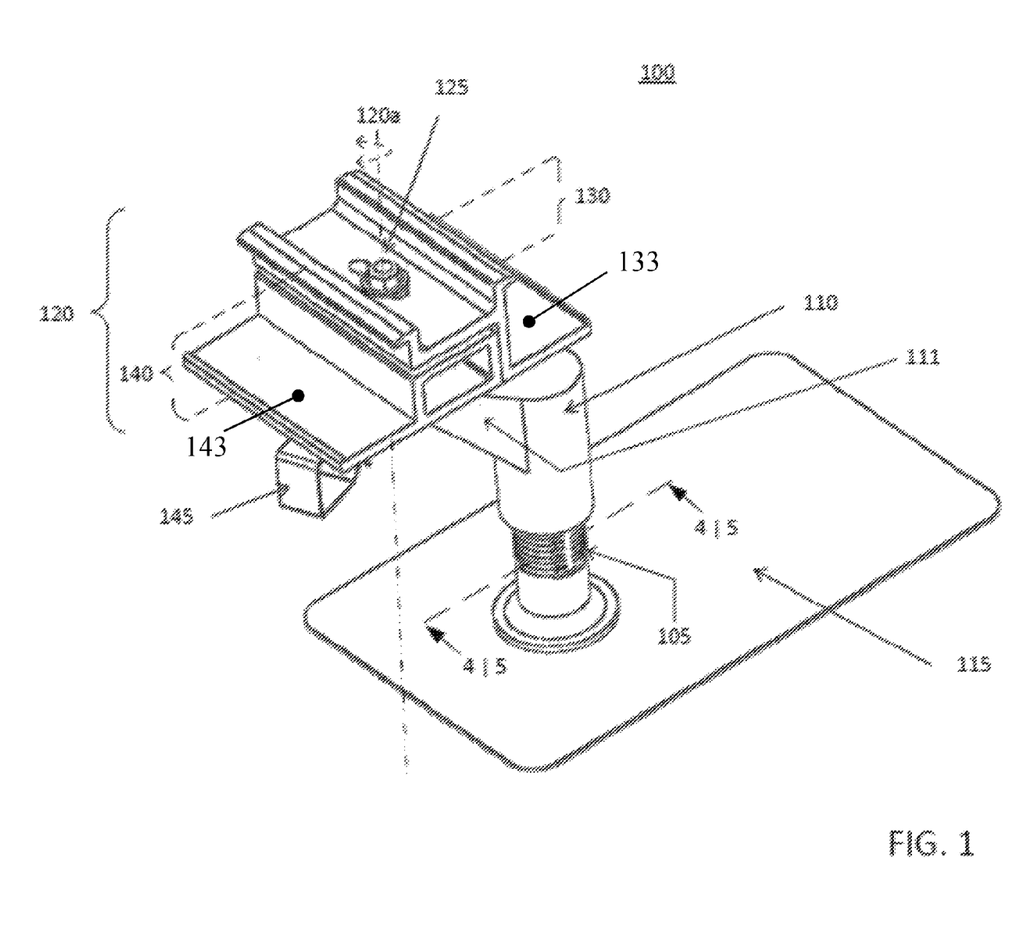
FIG. 1 illustrates a front side perspective view of a panel mount assembly coupled to a base portion, according to one or more embodiments of this disclosure.

FIG. 1 is a front side perspective view of a panel mount assembly, generally designated by reference number 100, coupled to a base portion 105, which base portion 105 is further coupled to a base plate 115 (e.g., a flashing, etc.). Notably, base plate 115 can include a sacrificial material, which may be attached to an installation surface thereby reducing wear on the installation surface caused by support base 105. As shown, panel mount assembly 100 and base portion 105 include corresponding threading to allow panel mount assembly 100 to couple with base portion 105.

Panel mount assembly 100 further includes a clamp assembly 120, a support arm 110 that defines a support shoulder 111, and a wire clip 145. As shown, clamp assembly 120 and wire clip 145 attach to support arm 110 with a fastener 125 (e.g., bolt/nut, etc.). Panel clamp assembly 120 further includes two brackets, which attach to respective solar panels. As discussed herein, these brackets are referred to as a first bracket 130 and a second bracket 140. The first bracket 130 and the second bracket 140 can be defined by separate bracket components 133, 143 respectively."

According to one or more embodiments discussed herein, a portion of first bracket component 133 defines a top portion of second bracket 140.

Operatively, panel clamp assembly 120 is free to rotate around support shoulder 111 (without interference) about a panel clamp axis 120a (coincident to the location of fastener 125). As discussed in greater detail below, such rotation facilitates securing or coupling one or more solar panels with clamp assembly 120.

In certain embodiments (not shown), support base 105 may connect directly to an installation surface (e.g., a roof) using, for example, a screw type fastener, or alternatively, support base 105 may simply rest on the installation surface (not be secured to the roof or any underlying structural members).

Figure 2:
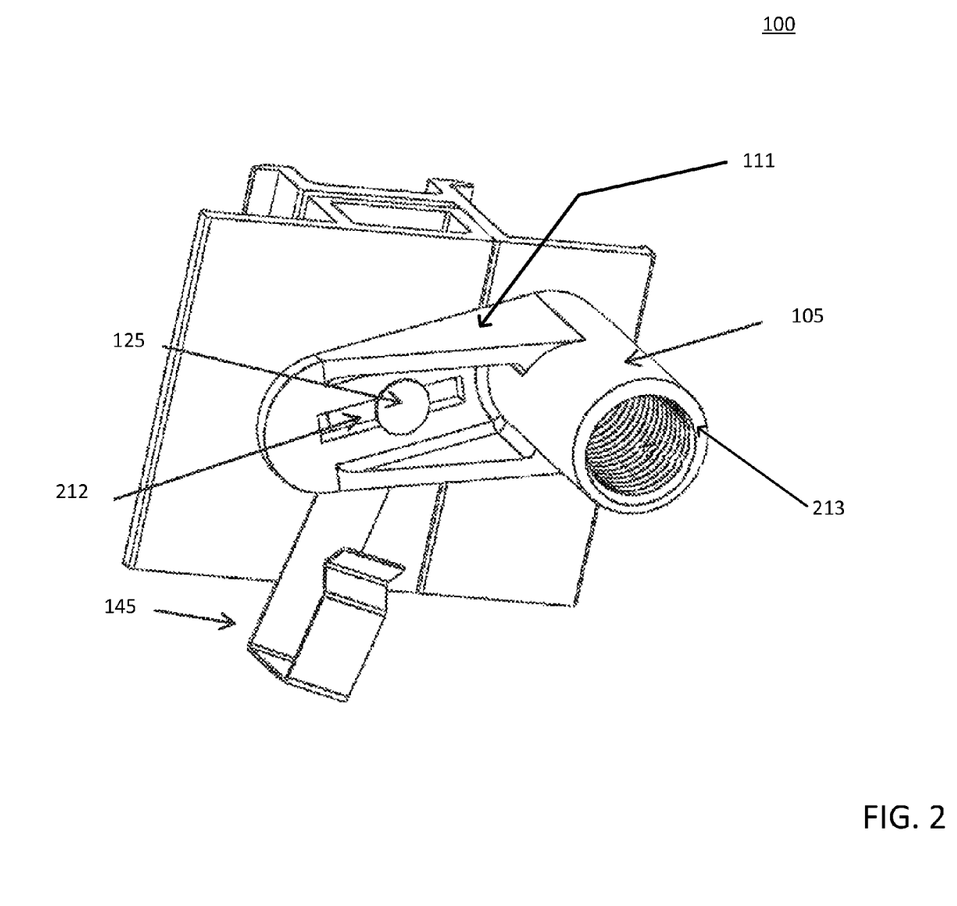
FIG. 2 is a bottom side perspective view of the panel mount assembly shown in FIG. 1.

FIG. 2 illustrates a bottom side perspective view of panel mount assembly 100. As discussed above, panel mount assembly 100 and base portion 105 include corresponding threading to allow panel mount assembly 100 to couple with base portion 105. As shown in FIG. 2, a wall 213 of support arm 110 defines such threading, which engages with corresponding threading on base portion 105. Moreover, rotation around support shoulder 111 is facilitated, in part, by a channel 212 (e.g., a slot) defined in support shoulder 111 that receives fastener 125. In addition to facilitating rotation around support shoulder 111, channel 212 also facilitates movement along support shoulder 111, as is appreciated by those skilled in the art (e.g., sliding movement within channel 212). In some embodiments, the channel 212 in combination with the shape of fastener 125 may prevent fastener 125 from rotating.

Figure 3A:
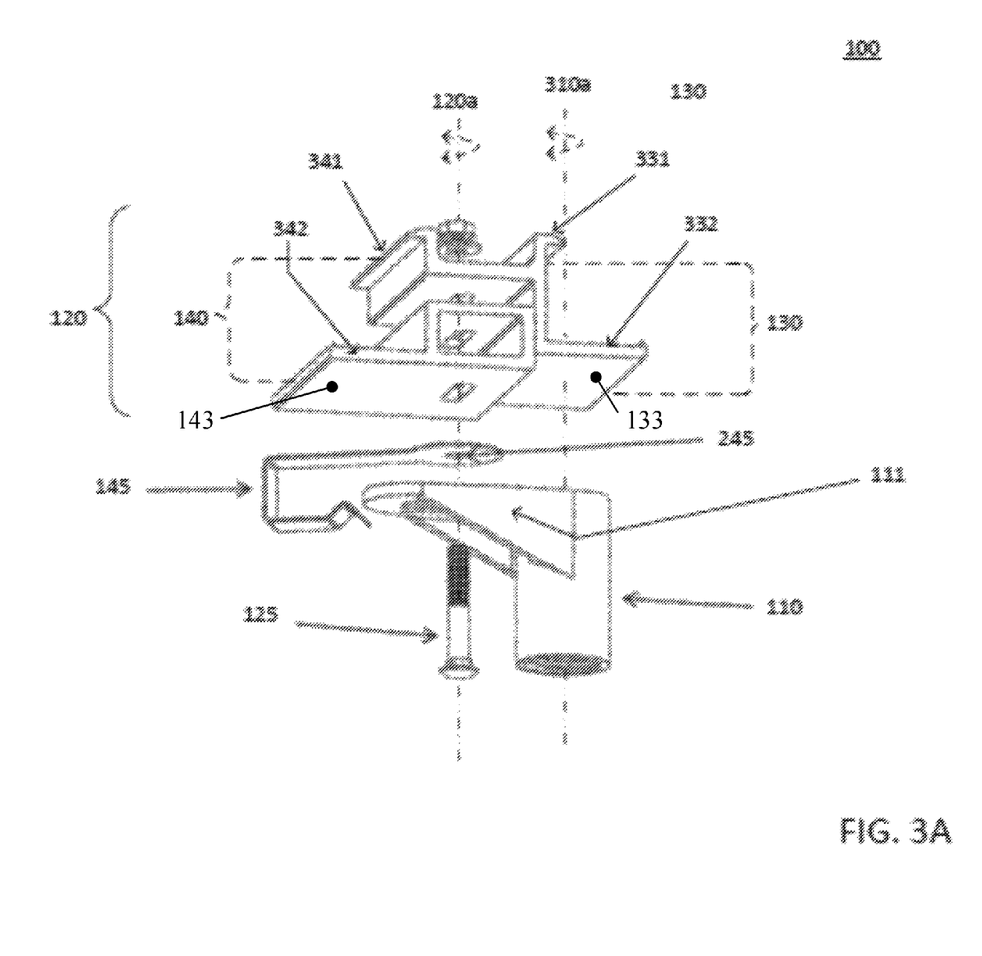
FIG. 3A illustrates a front side exploded perspective view of the panel mount assembly shown in FIG. 1.

FIG. 3A illustrates a front side exploded perspective view of panel mount assembly 100. As discussed above, clamp assembly 120 includes a first bracket 130 and a second bracket 140. The first bracket 130 and the second bracket 140 can also be defined by separate bracket components 133, 143 respectively." As shown in FIG. 3, each of the bracket components further includes one or more flanges, defining the brackets. Here, first bracket component 133 includes a top flange 331 and a corresponding bottom flange 332 for the first bracket 130 as well as a top flange 341 for the second bracket 140. The second bracket component 141 includes a bottom flange 342 for the second bracket 140. In some embodiments, top flange 331, bottom flange 332, and top flange 341 are integrally formed from as a single component, while bottom flange 342 is independently formed. Forming at least one of the flanges independently from flanges of another bracket component—here, bottom flange 342 is formed independently from bracket component 133 (and even from corresponding top flange 341)—allows independent degrees of displacement or movement for the associated bracket component—here, bottom flange 342 allows bracket component 143 to open further (or close further) when bottom flange 342 moves away from (or toward) top flange 341, discussed in greater detail below. Notably, such degrees of displacement are particularly useful when, for example, the respective bracket receives or couples to a corresponding solar panel during an installation.

Panel mount assembly 100 also includes a fastener 125 that secures clamp assembly 120 (and a wire clip 145) to support arm 110. In certain embodiments, wire clip 145 includes a serrated hole that provides a friction fit preventing fastener 125 from falling out of support arm 110 when not fully tightened, as well as opposing protrusions that can penetrate material of the bracket component 143 and support arm 110 (e.g., an anodized layer/coating), thereby creating an electrical bond path between all four respective components.

Figure 3B:
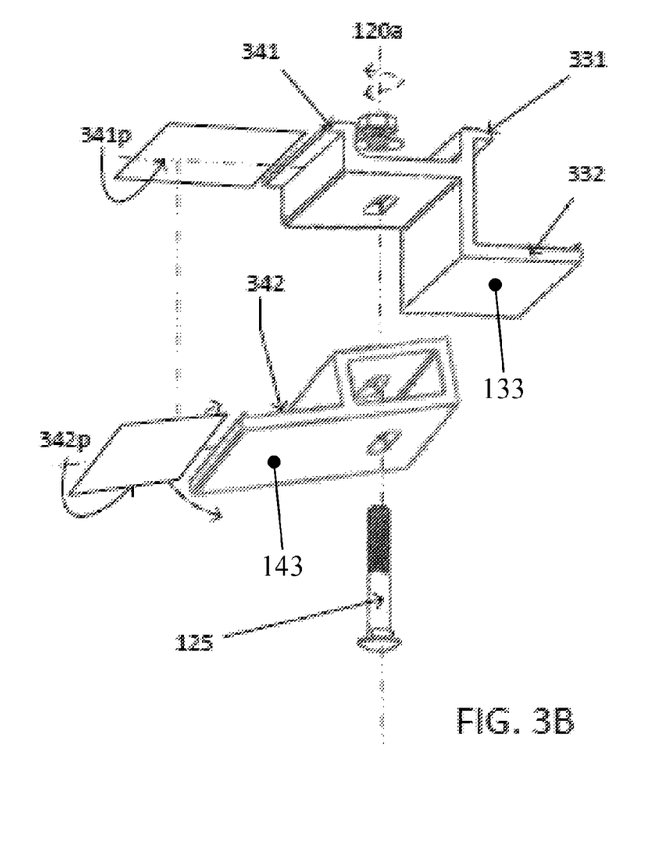
FIGS. 3B and 3C illustrate portions of the front side exploded perspective view of FIG. 3A, showing independent degrees of displacement for portions of a clamp assembly.
Figure 3C:
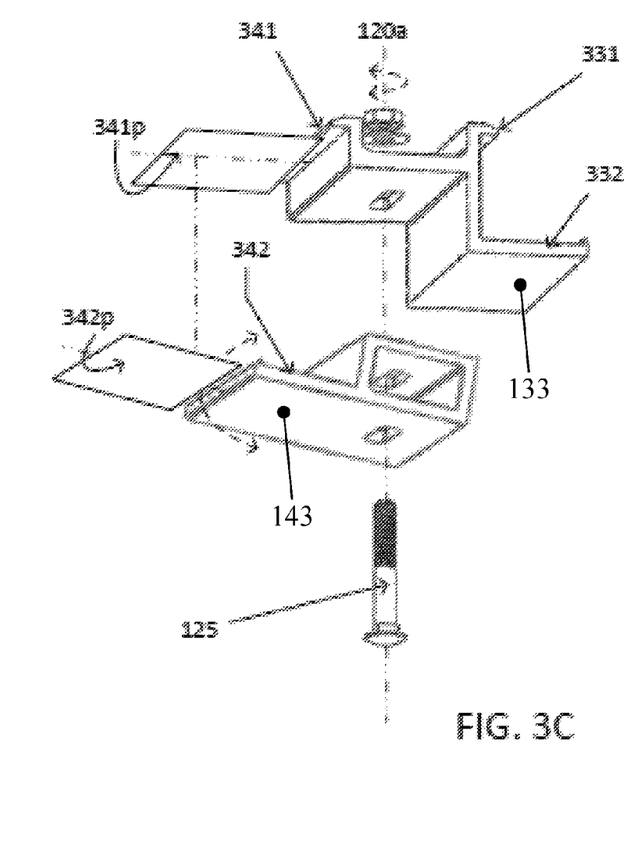

With respect to the degrees of displacement, FIGS. 3B and 3C, collectively, illustrate displacement for bottom flange 342 relative to top flange 341. As shown, portions of bottom flange 342—e.g., a bottom clamp face portion—are substantially oriented in a plane 342p and portions of top flange 341—e.g., a top clamp face portion—are substantially oriented in a plane 341p. The degree(s) of displacement for bottom flange 342 relative to top flange 341 are shown, in part, by the orientation of plane 341p relative to plane 342p and the angle or degree formed there-between. As shown, FIG. 3B illustrates bottom flange 342 moving away from top flange 341—i.e., the angle of displacement between planes 341p and 342p being greater than parallel, and FIG. 3C illustrates bottom flange 342 moving toward top flange 341—e.g., the angle of displacement between planes 341p and 342p being less than parallel.

Notably, the degree of displacement or movement is facilitated, in part, by fastener 125. Fastener 125 permits bottom flange 342 to move relative to top flange 341 when, for example, fastener 125 is not fully tightened. Further, fastener 125 also secures bottom flange 342 and top flange 341 together as a bracket. For example, when fastener 125 is tightened, it locks bottom flange 342 at a fixed distance from top flange 341—e.g., such that plane 341p and plane 342p are substantially parallel. In such instances, fastener 125 prevents degrees of displacement between the bottom flange 342 and top flange 341 by compressing portions of top flange 341 with portions of bottom flange 342—e.g., the portions of each flange in communication with fastener 125. Additionally, bracket 331 may have a ridge on the underside and against a vertical portion of flange 332 (not shown), which ridge may act as a fulcrum point for flange 342 as fastener 125 is tightened or loosened.

Figure 4:
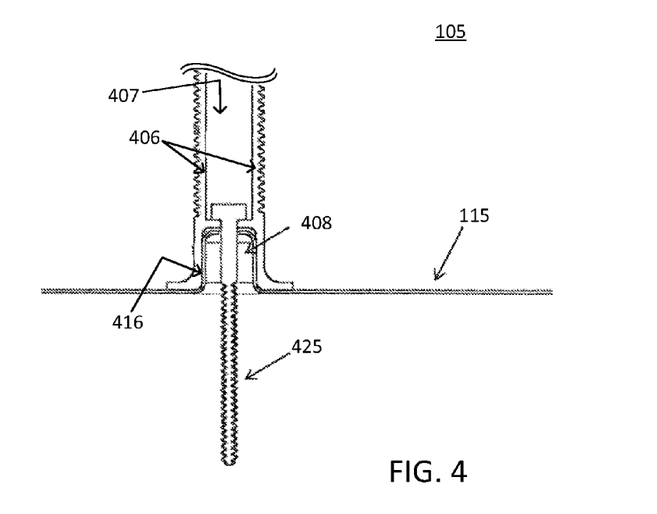
FIG. 4 illustrates a cross-sectional side elevation view of the base portion coupled to a base plate, viewed from cut-lines 4-4 in FIG. 1.
Figure 5:
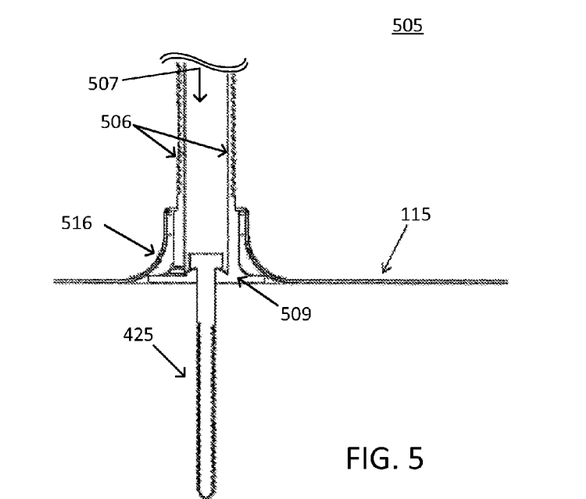
FIG. 5 illustrates a cross-sectional side elevation view of another embodiment of the base portion coupled to the base plate, viewed from cut-lines 5-5 in FIG. 1.

FIGS. 4 and 5 illustrate two embodiments or configurations to couple base portion 105 to base plate 115. In particular, FIG. 4 is a cross-sectional side elevation of base portion 105 viewed from cut-lines 4-4 in FIG. 1, and FIG. 5 is a cross-sectional side elevation of base portion 105 viewed from cut-lines 5-5 in FIG. 1.

Referring to FIG. 4, base portion 105 includes base walls 406 that define, for example, a tube having a hollow portion 407, and a separate cavity 408 or mounting chamber. Operatively, hollow portion 407 is typically sized to allow a fastener tool to secure fastener 425 to an installation surface (e.g., a roof joist, rafter, structural beam, or other appropriate structure) through base plate 115 and cavity 408. A protrusion 416 on base plate 115 protrudes some distance above its top surface to provide an elevated hole location for fastener 425 to pass through, which in turn reduces, for example, a possibility of water from reaching fastener 425. Cavity 408 is typically sized to closely fit over protrusion 416. For example, protrusion 416 and cavity 406 may be sized such that some force or no force is required to press protrusion 416 into cavity 406, and may be sized to create a seal, with or without caulking. Base walls 406 further separate cavity 408 from hollow portion 407, and may act as the load transfer interface between support base 105 and fastener 425. As shown, the walls 406 separate cavity 408 and hollow portion 407, and can be formed to include a flat surface, a dome shaped surface. In some embodiments, walls 406 separate only certain portions of cavity 408 and hollow portion 407—e.g., the walls can include holes centered through an axis of support base 105 to allow fastener 425 to pass through with minimal hindrance.

In another embodiment shown in FIG. 5, base portion 105 includes base walls 506 that define a hollow portion 507 without a corresponding cavity (e.g., 408), shown in FIG. 4. According to this embodiment, base plate 115 includes protrusion 516—here, a cone-shaped protrusion—that extends from base plate 115 to surround an outside of base portion 105. That is, base portion 105 (e.g., a lower part of base portion 105) can fits within protrusion 516. Protrusion 516 may have a concave shape, as shown, or may also include a diagonally straight shape, a convex shape, or some similar shape. Base portion 105, as shown in FIG. 5, also includes a base floor 509 that sits flush with a lower surface of base plate 115. In this fashion, base floor 509 acts as a barrier between hollow portion 507 and the installation surface (not shown), and may further act as a load transfer interface between support base 105 and fastener 425. Notably, base floor 509 may have a dome shaped top surface as shown, or a flat surface.

Figure 6:
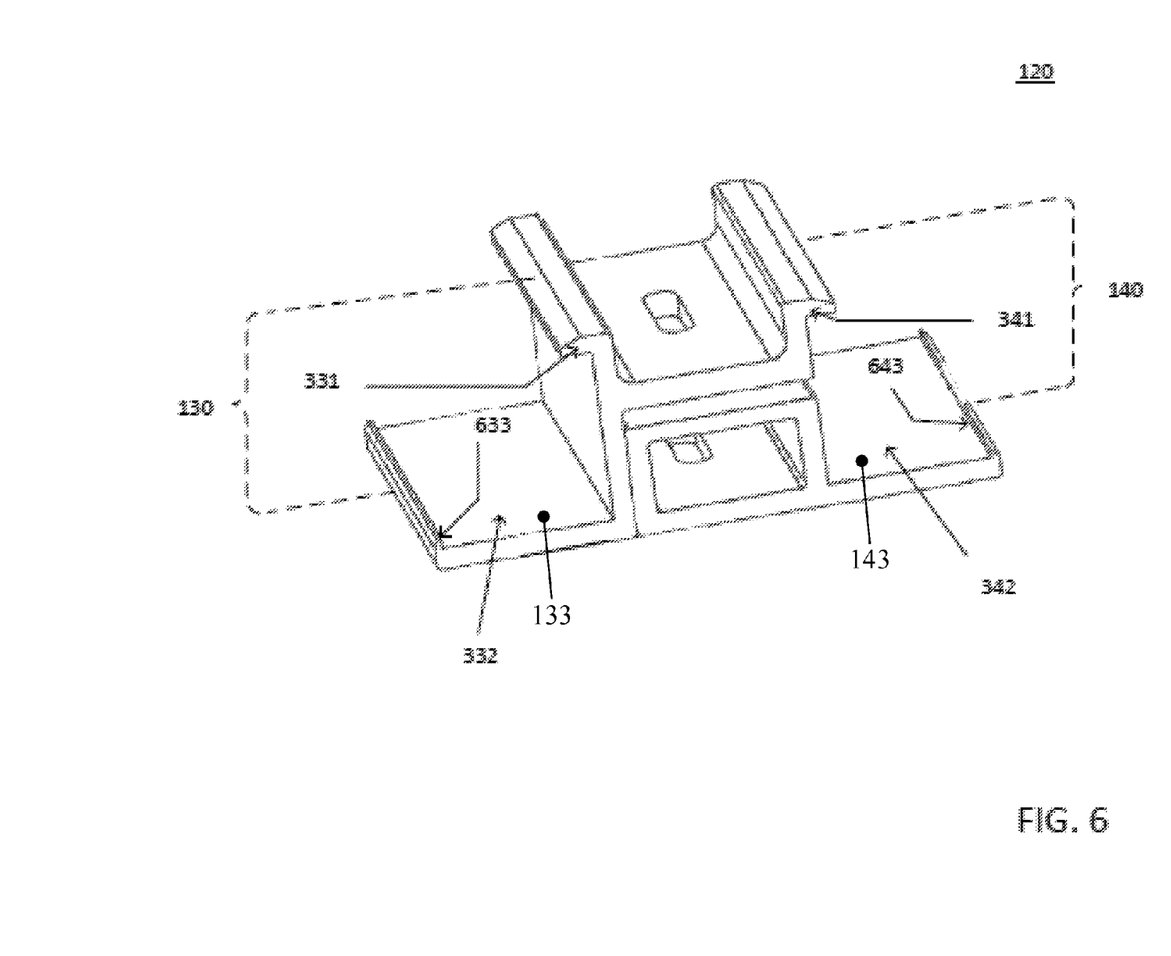
FIG. 6 illustrates a back side perspective view of a portion of the panel mount assembly shown in FIG. 1, showing a clamp assembly.

FIG. 6 illustrates a back side or rear side perspective view of clamp assembly 120 (e.g., viewed from the opposite side to that shown in FIG. 1). As discussed above, clamp assembly 120 includes two brackets—first bracket 130 and second bracket 140. Operatively, each bracket receives a corresponding solar panel within top flanges (331/341) and bottom flanges (332,342). As shown, second bracket 140 includes a second bracket component 143 with a bottom flange 342 that allows for the degrees of displacement or movement, discussed above. Such displacement or movement facilitates efficient solar panel installation since it accommodates slight variances in solar panel frames, clip assembly orientation, and the like. Put differently, first bracket 130 secures or couples to a corresponding solar energy panel based on fixed dimensions—e.g., manufactured dimensions—for top flange 331 and bottom flange 332 whereas the second bracket 140 secures or couples to a corresponding solar energy panel by compression from fastener 125, which compresses the bottom flange 342 and top flange 341 together. According to this embodiment, first bracket component 133, including top flange 331 and bottom flange 332, and top flange 341 of second bracket 140 are unitarily formed or constructed as a single component, apart from bottom flange 342.

In addition, each flange also includes a corresponding protrusion or "tooth" configured to attach to a solar panel—e.g., secure to an inside of a solar panel frame, etc. Here, first bracket component 333 includes a protrusion 633 and second bracket component 343 140 includes a protrusion 643. Protrusion 633 and 643 may extend vertically from corresponding bottom flanges a sufficient distance to prevent a solar panel from dislodging from clamp assembly 120.

In certain other embodiments, each of the brackets can also receive and secure an edge of a frameless solar energy panel. Additionally, each bracket may be manufactured with different respective distances between top and bottom flanges to accommodate different sized solar energy panel frames, using the same clamp assembly. For example, one bracket may have a height such that a solar panel frame installs with little to no friction between corresponding flanges. Further, top flanges 331 and 341 may be shaped to not over-extend beyond the width of a solar panel frame, and may have a bevel to reduce possible shading on active portions of the solar panel. For some embodiments, second bracket 140 can have a box-shape profile, whereby a uniform wall vertical is formed when joining or compressing bottom flange 342 and top flange 341 together. This box-shape profile reduces deflection of second bracket 140 when put in compression (e.g., upon installation of a solar panel, etc.). In alternative embodiments (not shown) clamping surfaces—e.g., top/bottom flanges may have a rubber-like surface to grip the edge of a frameless solar panel. Notably, in other embodiments, the top flange 331 and bottom flanges 332 and 342 are formed from a single part, while flange 341 is formed separate component without departing from the scope of this disclosure.

Figure 7:
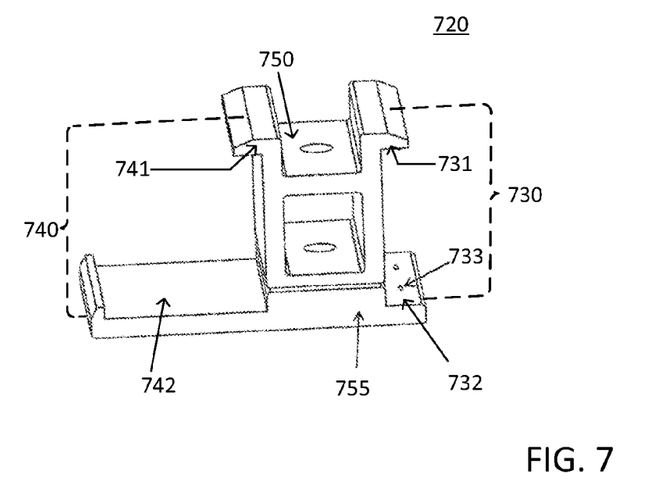
FIG. 7 illustrates a front side perspective view of another exemplary embodiment of a clamp assembly.

FIG. 7 illustrates a front side perspective view of another exemplary embodiment of a clamp assembly 720. Clamp assembly 720, like clamp assembly 120 includes two brackets—here bracket 730 and bracket 740, including respective top flanges 731/741 and bottom flanges 732/742. According to this embodiment, however, top flanges 731/741 are unitarily formed from a single flange plate 750 and the bottom flanges 732/742 are likewise unitarily formed from a single flange plate 755. Operatively solar panels are secured or coupled to clamp assembly 720 by compressing flange plate 750 to flange plate 755, compressing both top flanges and bottom flanges for corresponding brackets together.

Additionally, as shown, bracket 730 is shown in an asymmetrical configuration where protrusions 733 (e.g., spikes, etc.) on bottom flange 732 protrude toward outward toward top flange 731. In some embodiments, protrusions 733 may be on flange 741, 742, or 731. Protrusions 733 may be sharp such that when a solar energy panel frame is compressed, they penetrate some distance into the solar panel frame. In some instances, the protrusions can extend through a paint or an anodize layer in the solar panel frame, in order to secure the solar energy panel and also to create an electrical path. In other embodiments (not shown), bracket 730 and bracket 740 can be symmetrical, and can each include protrusions 733.

Figure 8:
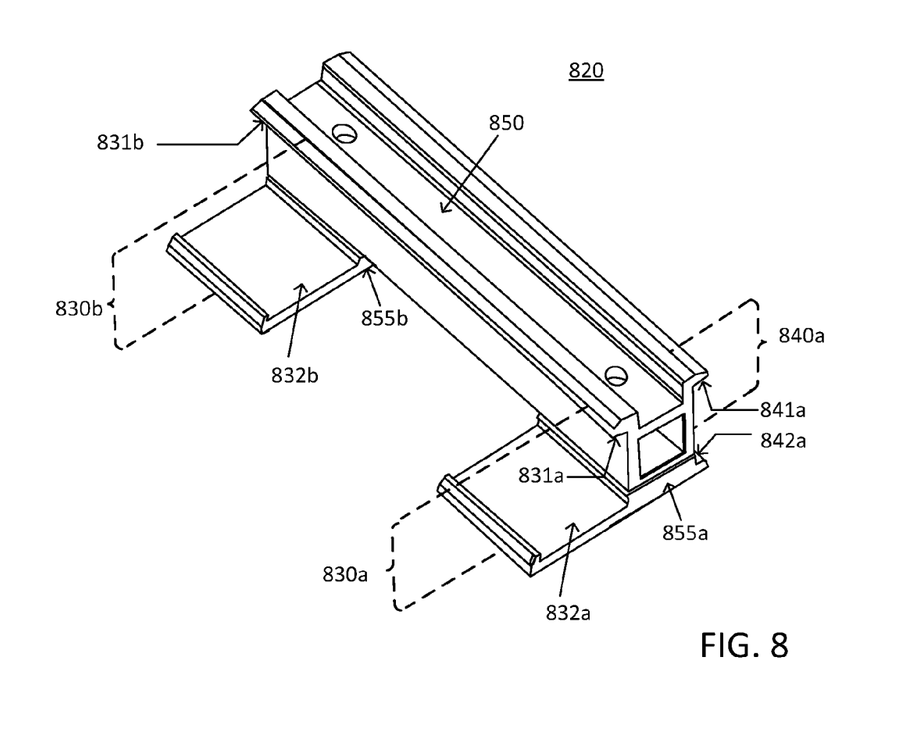
FIG. 8 illustrates a front side perspective view of another exemplary embodiment of a clamp assembly.

FIG. 8 illustrates a front side perspective view of another exemplary embodiment of a clamp assembly 820. Clamp assembly 820 includes multiple brackets—830a, 830b, 840a, and 840b, formed by separate flanges plates—e.g., a single top flange plate 850 and multiple bottom flange plates 855a,b. As shown, each bracket includes corresponding top flanges 831(a,b)/841(a,b) and bottom flanges 842(a, b (not shown)) formed by compressing top flange plate 850 together with corresponding bottom flange plates 855a,b. Notably, clamp assembly 820 shares a similar cross section as clamp assembly 720, however, clamp assembly 820 can also secure multiple solar panels (e.g., four panels) and/or secure to a single solar panel at multiple locations, discussed in greater detail below.

Figure 9:
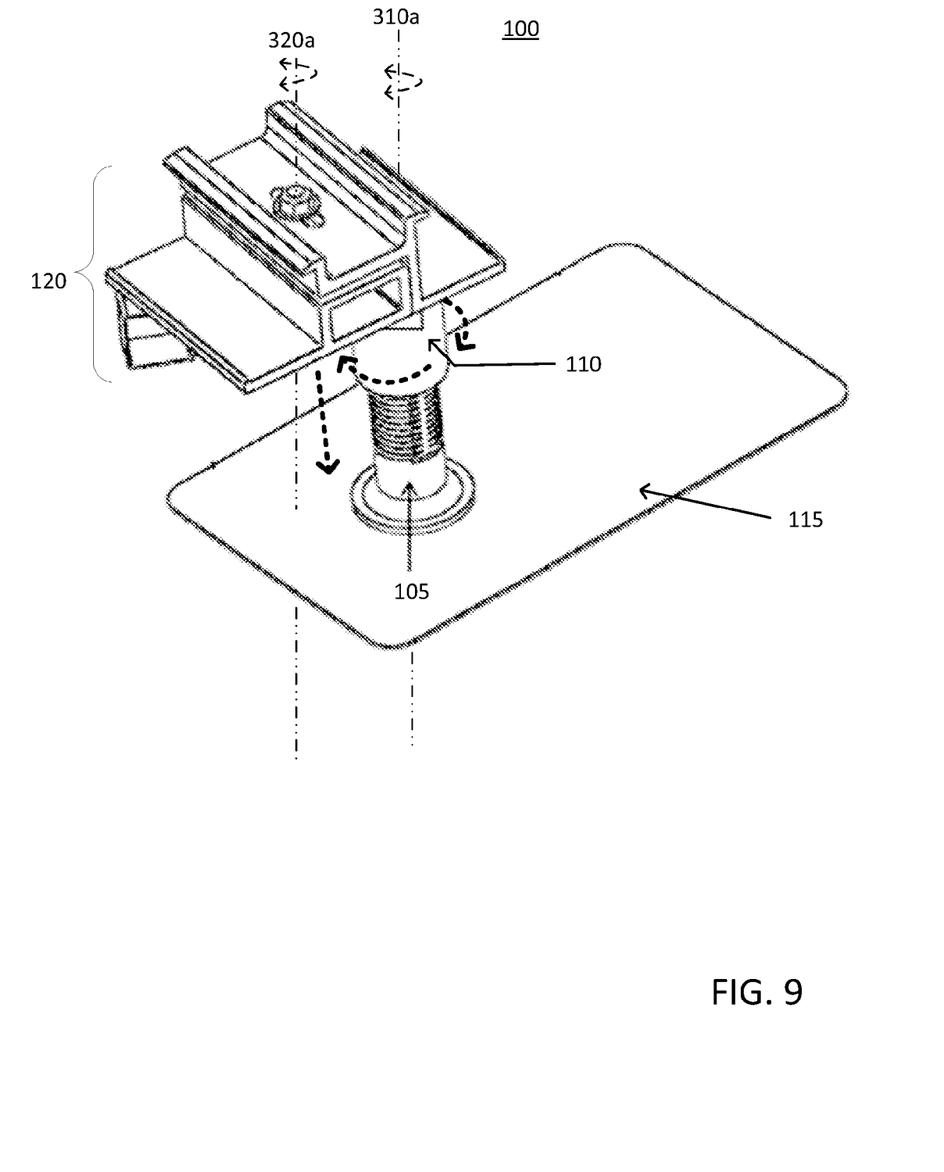
FIG. 9 illustrates a front side perspective view of the panel mount assembly shown in FIG. 1, coupling to the base portion.

Referring to FIG. 9, a front side perspective view of panel mount assembly 100 is shown coupling to base portion 115. Although panel mount assembly 100 is shown with clamp assembly 120, any of the above discussed embodiments are interchangeable, as is appreciated by those skilled in the art. As shown in FIG. 9, one method for installing panel mount assembly 100 to base portion 115 includes rotating support arm 110 about support arm axis 310a, so that support arm 110 engages corresponding threading on base portion 105. Notably, the threading may be at a pitch such that each rotation of support arm 110 relative to base portion 105 alters the vertical distance of the support arm assembly relative to base portion 105. In preferred embodiments, support arm 110 may be adjusted to a particular height relative to an installation surface. This is a key feature as it allows for quick and easy adjustability of the height of the support arm above, for example, an installation surface, and requires no tools or additional alteration of the assembly (e.g., aside rotation of the support arm). Further, coupling panel mount assembly 100 with base portion 115 additionally encloses hollow portion 407 or 507 (shown in FIGS. 4 and 5 respectively), thereby preventing water or moisture from reaching fastener 425. Moreover, support arm 110 and clamp assembly 120 can be pre-assembled at an off-site location relative to the final installation location. This pre-assembly is a key feature of the design because it may reduce the time spent installing a solar energy system at the final installation site.

Figure 10:
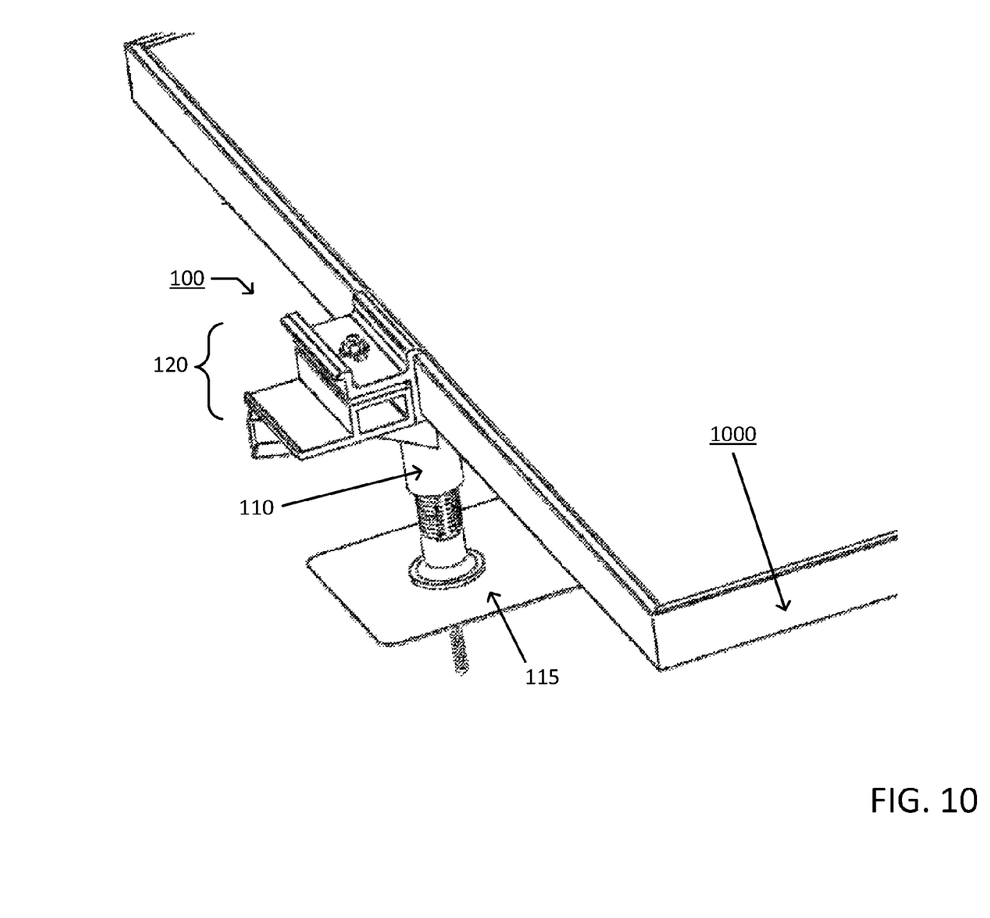
FIG. 10 illustrates a front side perspective view of the panel mount assembly shown in FIG. 1, coupled to a solar panel.

FIG. 10 is a front side perspective view of panel mount assembly 100 coupled to a solar panel frame 1000. As shown, support arm 110 and clamp assembly 120 are installed on base portion 105, with solar panel frame 1000 engaging with panel clamp assembly 120. Panel clamp assembly may engage with either the long side or short side of solar energy panel 1000. In this configuration, the solar panel is moved and positioned to install onto a substantially stationary clamp assembly 120. The solar panel may be installed at some angle greater than parallel to the clamp base of the panel clamp assembly, and upon engaging with the panel clamp assembly, the solar panel may rotate down to be substantially parallel with the base plate 115.

Figure 11A:
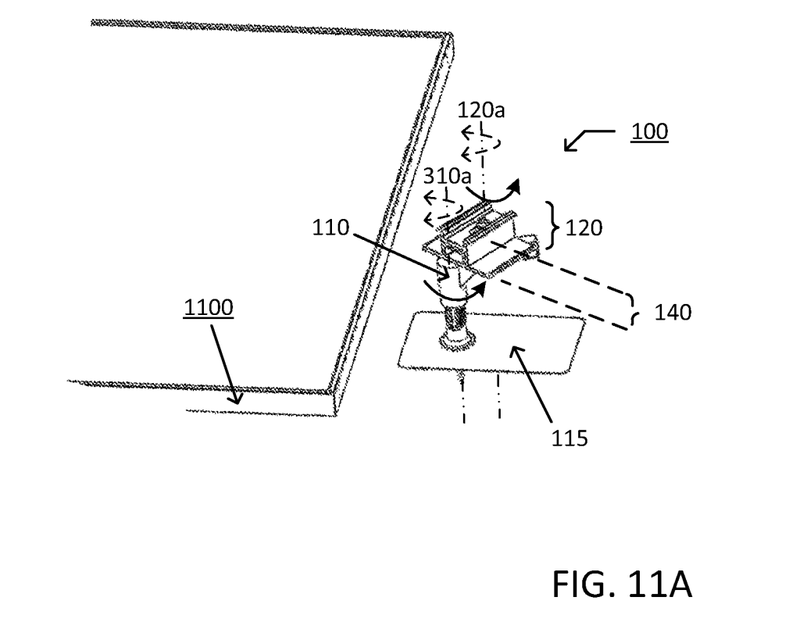
FIG. 11A illustrates a back side perspective view of the panel mount assembly shown in FIG. 1, coupled to a solar panel.
Figure 11B:
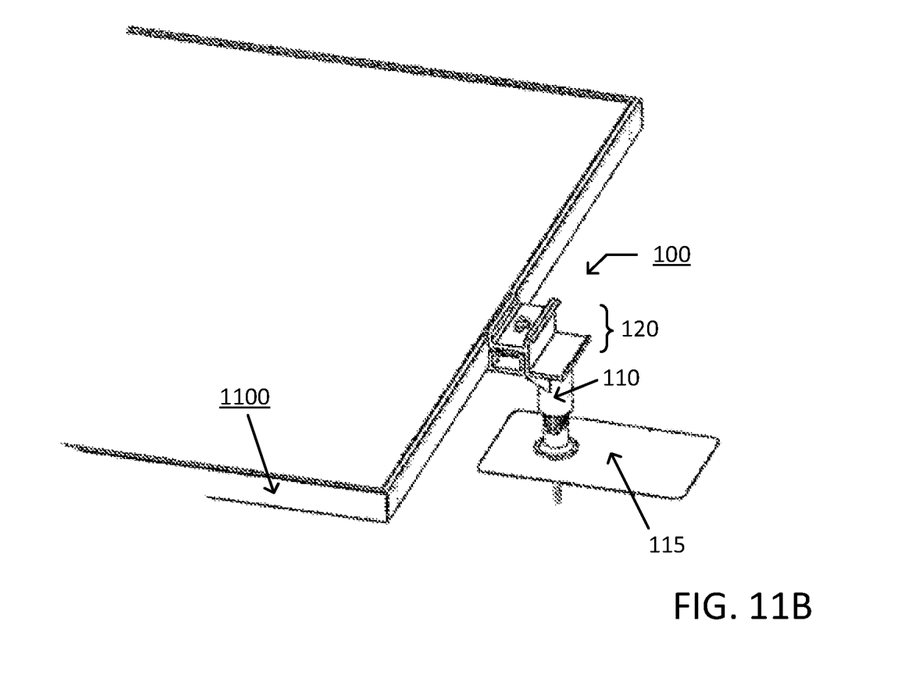
FIG. 11B illustrates a front side perspective view of the panel mount assembly shown in FIG. 1, subsequently coupled to the solar panel.

FIGS. 11A and 11B, collectively, illustrate another method for coupling mount assembly 100 to a corresponding solar panel frame. In particular, FIG. 11A illustrates a back side perspective view of the panel mount assembly 100, prior to coupling with a solar panel 1100, and FIG. 11B illustrates a front side perspective view of the panel mount assembly 100 subsequently coupled to the solar panel 1100. Operatively, the solar panel 1100 is substantially stationary, while panel mount assembly 100 rotates into position. Here, support arm 110 and clamp assembly 120 rotate and move to engage with solar panel 1100.

From FIG. 11A to FIG. 11B, support arm 110 and clamp assembly 120 are rotated about respective axis 310a and 120a to engage with solar panel 1100. In this embodiment, bracket 140, including top flange 341 and bottom flange 342, engage solar panel 1100. Fastener 125 can be adjusted (loosened/tightened) to allow sufficient clearance between the each flange to engage with the solar panel 1100. After coupling to solar panel 1100, fastener can be tightened to compress the flanges together, as discussed above. Tightening fastener 125 also prevents clamp assembly 120 from rotating around axis 120a, and when solar panel 1100 is substantially stationary, prevents support arm 110 from rotating around axis 310a.

Figure 12:
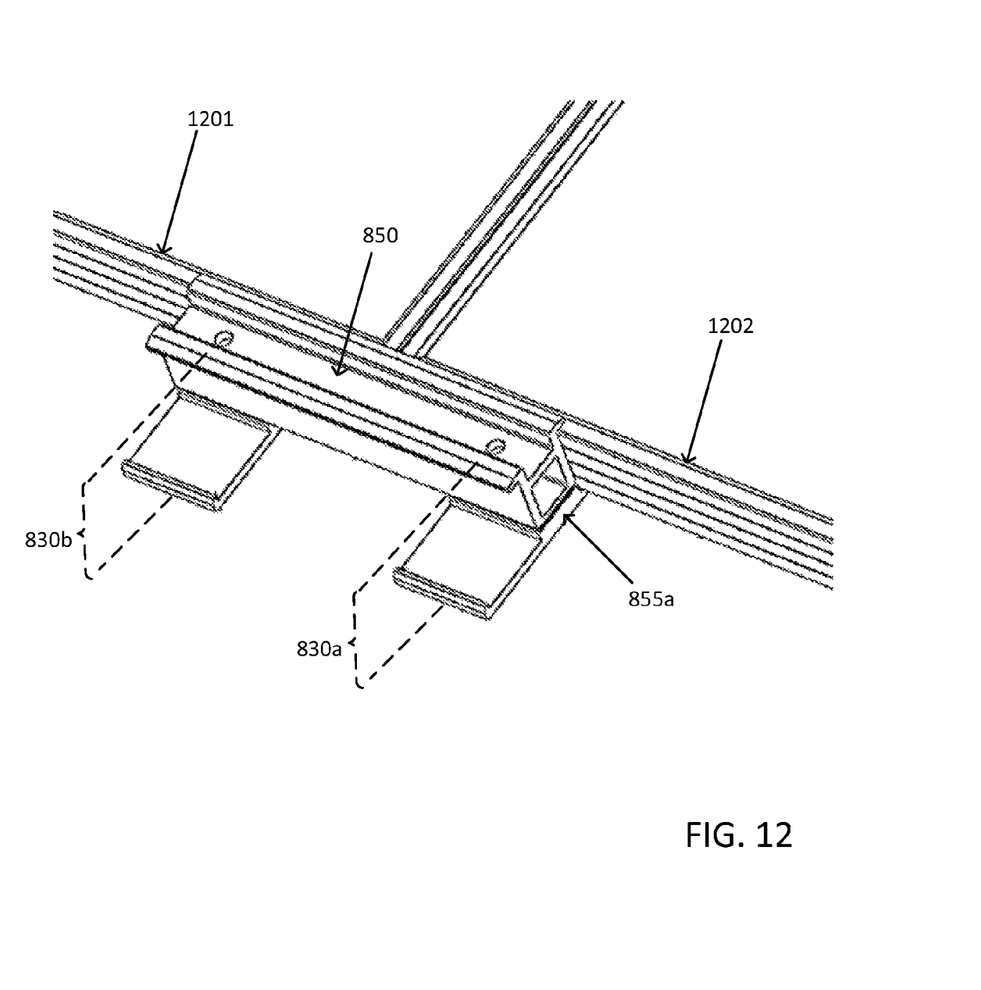
FIG. 12 illustrates a front side perspective view of the clamp assembly shown in FIG. 8, coupled to multiple solar panels.

FIG. 12 illustrates a front side perspective view of clamp assembly 820, coupled to multiple solar panels. As shown, clamp assembly 820 can be used without a support arm, or base portion. Further clamp assembly 820 can be used to secure two or four panels in a single plane and essentially act as a splice. This splice can be further used in conjunction with other mounting assemblies, which would secure the solar panels to an installation surface.

As discussed above, bottom flange plates 855a,b can be compressed by a fastener (not shown) toward top flange plate 850 thereby engaging multiple brackets at the same time. In addition, clamp assembly 820 can secure multiple solar panels at the same time—here, solar panel 1200 and 1201. In this fashion, clamp assembly 820 may act to load balance various forces—e.g., transfer loads and forces acting on one solar energy panel to the adjacent one or more solar energy panels.

Figure 13:
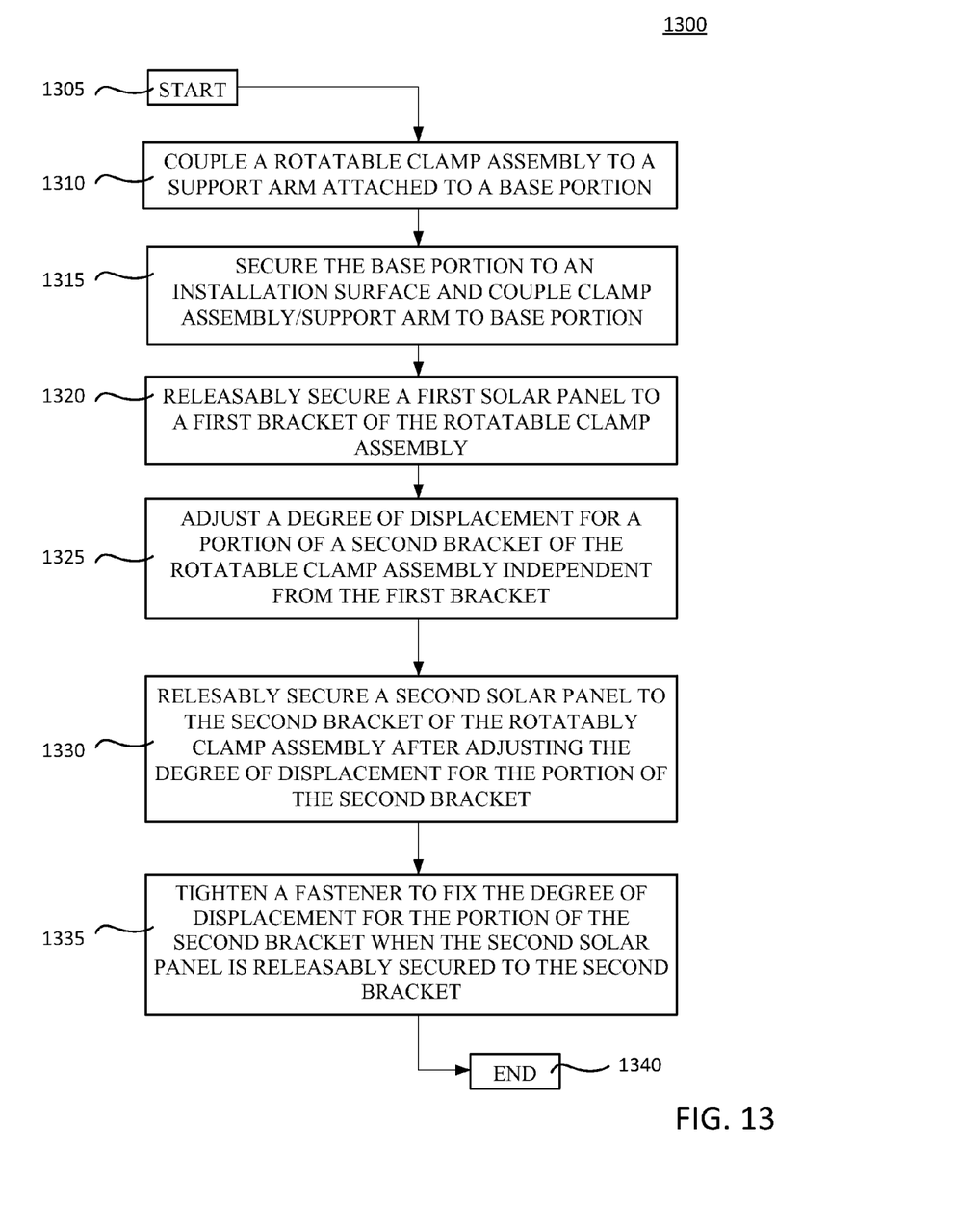
FIG. 13 illustrates an exemplary simplified procedure for mounting solar panels, in accordance with one or more embodiments of this disclosure.

FIG. 13 is an exemplary simplified procedure 1300 for mounting solar panels to an installation surface, using a solar panel mount assembly, in accordance with one or more embodiments of this disclosure.

Procedure 1300 being at step 1305 and continues on to step 1310 where the rotatable clamp assembly is coupled to a support arm. As discussed above, this step can be pre-assembled prior to arriving at an installation site, which facilitates efficient installation. Optionally, as shown in step 1315, the base portion can be further secured to an installation surface. In this case, a base plate or flashing will be placed on an installation surface over a connection point (e.g. a hole), a base portion will be installed over the flashing, and a fastener will secure the base portion and flashing to the installation surface. Alternatively, the base portion can simply rest on the top of the installation surface (e.g., for commercial installations with a flat installation surface/roof). Further, the clamp and support arm assembly are attached to the base portion (e.g., using complimentary threading patterns). Operatively, the clamp and support arm assembly are rotated with respect to a base portion, engaging the threaded interface, thereby raising or lowering the clamp and support arm assembly to a desired height above an installation surface.

Next, in step 1320, a first solar panel is releasably secured to a first bracket of the rotatable clamp assembly. As discussed above, the second bracket, may include a corresponding top flange and bottom flange, which are independently movable from the first bracket. Accordingly, in step 1325, a degree of displacement or a degree of movement for a portion of the second bracket (e.g., one of the flanges) is adjusted independent from the first bracket. In this fashion, an installer has flexibility when releasably securing (step 1330) a subsequent solar panel to the second bracket. Further, in step 1335, a fastener is tightened to fix the degree of displacement for the portion of the second bracket when the second solar panel is releasably secured to the second bracket. Procedure 1300 subsequently ends at step 1340.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A solar panel mount assembly, comprising:
   a substantially axial, threaded base portion mountable to an installation surface;
   a support arm comprising:
   a threaded cavity configured with complimentary threading to the threaded base portion to allow the support arm to thread on to the threaded base portion at a range of heights; and a support shoulder substantially orthogonal to base portion when the support arm is threaded on to the base portion, the support shoulder including a channel disposed therein; and a rotatable clamp assembly including at least two bracket components each having a respective aperture disposed therethrough, wherein the rotatable clamp assembly is coupled to the support arm with a bolt inserted through the respective apertures, through the channel, and fastened with a nut;

wherein the channel is configured to allow the rotatable clamp assembly an ability to traverse the channel when the bolt is loosely fastened with the nut, wherein the at least two bracket components releasably secure a portion of one or more solar panels when the bolt is tightly fastened with the nut.

2. The solar panel mount assembly of claim 1, further comprising:

a base plate configured to releasably couple to the base portion.

3. The solar panel mount assembly of claim 2, wherein the base plate is a flashing.

4. The solar panel mount assembly of claim 3, wherein at least a portion of the flashing includes a protrusion received by a cavity defined in the base portion, the protrusion creates a seal about a fastener disposed within the cavity defined in the base portion.

5. The solar panel mount assembly of claim 1, further comprising:

a wire clip disposed between the support arm and the clamp assembly.

6. The solar panel mount assembly of claim 1, wherein the clamp assembly is rotatable about a fastener axis defined by the respective apertures being aligned.

7. The solar panel mount assembly of claim 6, wherein the bolt cooperates with the support arm and the clamp assembly to increase or decrease the independent degrees of displacement of the bracket components when each bracket component in the at least two bracket components releasably secures the portion of the one or more solar panels.

8. The solar panel mount assembly of claim 1, wherein the bracket components form at least two brackets including at least one of a top flange and a bottom flange that cooperate to releasably secure the portion of the one or more solar panels.

9. The solar panel mount assembly of claim 8, wherein at least one of the top flange or the bottom flange for at least one of the bracket components includes one or more protrusions that engages with a portion of the one or more solar panels.

10. The solar panel mount assembly of claim 9, wherein the one or more protrusions are configured to puncture a frame of the one or more solar panels to form an electrical path.

11. A method for securing a solar panel to a solar panel mount assembly, the method comprising:

securing a substantially axial, threaded base portion of the solar panel mount assembly to an installation surface;

securing a support arm of the solar panel mount assembly to the base portion by rotating a threaded cavity of the support arm, having complimentary threading to the threaded base portion, onto the threaded base portion, the support arm further comprising a support shoulder having a channel disposed therein;

rotating the support arm on the threaded base to adjust a distance of the support arm relative to the installation surface; and aligning a clamp assembly with the channel of the support shoulder, the clamp assembly comprising at least two brackets comprised of separate bracket components, the bracket components each having a respective aperture disposed therethrough; securing the clamp assembly to the support shoulder via a fastener placed through the respective apertures and the channel, wherein the channel is configured to allow the clamp assembly an ability to traverse the channel when the fastener is loosely fastened.

12. The method of claim 11, wherein the step for securing the base portion of the solar panel mount assembly to an installation surface further comprises:

securing the base portion to a base plate mounted to the installation surface.

13. The method of claim 12, wherein the base plate is a flashing.

14. The method of claim 11, further comprising:

aligning the solar panel between at least one of the at least two brackets of the clamp assembly;

adjusting the clamp assembly to clamp the solar panel by moving the fastener in the channel; and tightening the fastener to clamp the solar panel.

* * * * *